United States Patent [19]

Friends et al.

[11] Patent Number: 4,663,409

[45] Date of Patent: May 5, 1987

[54] ALPHA, BETA-UNSATURATED CARBONYL MODIFIED AMINO ACID MONOMER AND POLYMERS FOR BIOMEDICAL USES

[75] Inventors: Gary D. Friends, Ontario, N.Y.; Richard C. Chromecek, Litchfield, Conn.; Raymond A. Yourd, III, Rochester, N.Y.

[73] Assignee: Bausch & Lomb Incorporated, Rochester, N.Y.

[21] Appl. No.: 685,950

[22] Filed: Dec. 24, 1984

[51] Int. Cl.$^4$ .................. C08F 212/20; C08F 212/30; C08F 226/00; C08F 226/02

[52] U.S. Cl. .................................. 526/242; 526/288; 526/304; 526/307; 526/312; 526/302; 526/279; 526/301; 526/258; 526/262; 526/265

[58] Field of Search ............... 526/312, 242, 288, 279, 526/302, 304, 307

[56] References Cited

U.S. PATENT DOCUMENTS 4,060,689 11/1971 Harris .................................. 526/301
4,172,934 10/1979 Heilmann ............................ 526/298

*Primary Examiner*—Joseph L. Schofer
*Assistant Examiner*—Peter F. Kulkosky
*Attorney, Agent, or Firm*—Bernard D. Bogdon; DeWitt M. Morgan; Annette M. Sansone

[57] ABSTRACT

Inclusion of carbonyl modified amino acid monomers in polymeric compositions for biomedical applications, including contact lenses, increases the water content and oxygen permeability of the polymer without significant changes in other desirable properties of the polymer.

11 Claims, No Drawings

ALPHA, BETA-UNSATURATED CARBONYL MODIFIED AMINO ACID MONOMER AND POLYMERS FOR BIOMEDICAL USES

BACKGROUND

1. Field of the Invention

This invention relates to the inclusion of amino acid based monomers into polymeric compositions for biomedical uses.

2. Description of the Prior Art

Carboxylic acid containing polymers for contact lenses and other biomedical uses are well known, for instance see U.S. Pat. No. 3,822,089 granted July 2, 1974 to Otto Wichterle. Their major advantage is the enhanced water content of the polymer and higher oxygen permeability. However, these polymers have low mechanical strength. As a result, other polymeric compositions have been suggested. U.S. Pat. No. 3,937,680 granted to de Carle discloses a terpolymer of hydroxyethyl methacrylate, N-vinyl pyrrolidinone and acrylic acid. While water contents of up to 90% can be achieved, the mechanical properties are unsatisfactory. U.S. Pat. No. 3,988,274 granted Oct. 26, 1976 to E. Masuhara et al discloses that the strength of carboxylic acid containing polymers are enhanced by the use of alkyl methacrylates, e.g., n-butyl methacrylate. Further, attempts to improve polymers include the addition of another vinyl monomer, vinyl acetate, see U.S. Pat. No. 4,143,017 granted Mar. 6, 1979 to N. Tarumi et al.

Unexamined Japanese patent publication No. 149014/81 discloses an amino acid copolymer of 30% benzyl glutamate and 70% leucine for contact lenses. The polymer has a water content of 2%. After treatment with 3-hydroxypropylamine for 65 hours the water content was increased to 48% with a slight increase in oxygen permeability. This polymer is made with (1) only amino acids and (2) a different approach to obtain a polymer with entirely different characteristics than the polymers of the present invention. The post treatment of the reference polymers is unsatisfactory because of the length of time required, variations in products and side products produced. Derwent Publications abstract 96145D of unexamined Japanese patent publication No. 149015/81 discloses an amino acid copolymer of alanine and methionine (2:1) can also be used for contact lenses, but no details of preparation or properties thereof are disclosed.

Typically to fabricate a contact lens from the carboxylic polymers above, polymeric rods are cast, sliced and subsequently lathe cut. Irrespective of the final article the polymerization usually takes considerable time, up to a week, combined with controlled temperature gradients to avoid bubbles and stresses in the article.

Certain biomedical articles, e.g., contact lenses, can also be prepared by spincasting. Spincasting of these polymers using open molds is difficult because of the volatility of the monomers, e.g., acrylic or methjacrylic acid, N-vinyl pyrrolidinone, and methyl acrylate or methacrylate. During spincasting, in a thin layer at the surface, evaporation changes the composition of the original monomer mixture which in turn affects the reproducibility of the contact lens properties.

It has now been found that monomers derived from amino acids are non-volatile and very often crystalline materials which can be dissolved in water or other solvents including comonomers. These monomer solutions do not change their composition during spincasting.

SUMMARY OF THE INVENTION

In accordance with this invention there is provided a shaped article for biomedical applications made from a polymer formed by polymerizing together a mixture comprising:

(1) a major amount of one or more hydrophilic monomers having an olefinic bond, (2) an alpha, beta-unsaturated carbonyl modified amino acid monomer in an amount of 1 to 15 weight percent, and (3) a cross-linking agent in an amount of at least 0.1 weight percent.

The hydrophilic monomers of this invention have an olefinic bond. More particularly these monomers include the hydroxyalkyl esters and amides, both N-substituted and unsubstituted, of alpha, beta-unsaturated carboxylic acids, N, vinyl lactams, and 2-acrylamido-2-methylpropane sulfonic acid. Included within the alpha, beta unsaturated acids useful in this invention are acrylic acid, crotonic acid, methacrylic acid, itaconic acid, maleic acid, maleic anhydride and fumaric acid. The poly-functional alcohols which form the hydroxyalkyl esters include glycol, glycerol, propylene glycol, trimethylene glycol and other polyhydric alkanols, dialkylene glycols of 2 to 12 carbon atoms and polyalkylene glycols. Polyalkylene glycols are exemplified by triethylene glycol, tetraethylene glycol, pentaethylene glycol, hexaethylene glycol and the like. The best known of these hydroxyalkyl esters, is, of course, hydroxyethyl methacrylate (HEMA).

Useful amides of the foregoing acids include diacetone, acrylamide and N-mono or disubstituted diacetone acrylamide. Also useful are the amines of the foregoing acids such as mono- or di-alkylamino substituents.

The nitrogen containing monomer used in the preparation of the polymers and copolymers of this invention is conveniently referred to as an N-vinyl lactam which includes (a) N-vinyl lactams per se and (b) other heterocyclic N-vinyl monomers. Illustrative of the N-vinyl lactams that are employed in this invention are; N-vinyl-2-pyrrolidinone, N-(1-Methyl vinyl) pyrrolidinone, N-vinyl-2-piperidone and N-vinyl-2-caprolactam which may be substituted in the lactam ring by one or more lower alkyl groups such as methyl, ethyl or propyl, e.g., N-vinyl-5-methyl pyrrolidinone, N-vinyl-3,3-dimethyl pyrrolidinone, N-vinyl-5-ethyl pyrrolidinone and N-vinyl-6-methyl piperidone. Illustrative of the other heterocyclic N-vinyl monomers used in preparing the polymers of this invention are: N-vinyl imidazole, N-vinyl succinimide, N-vinyl diglycolylimide, N-vinyl glutarimide, N-vinyl-3-morpholinone and N-vinyl-5-methyl-3-morpholinone. The lactams may be effectively employed alone or in admixture with other lactam monomers to give hydrogels having the foregoing desirable characteristics. The preferred monomer is N-vinyl-2-pyrrolidinone.

The second monomeric component of this invention is an alpha,beta-unsaturated carbonyl modified amino acid monomer or monomers. This component is present in an amount from 1 to 15 weight percent and more preferably from 3 to 12 weight percent of the total monomers present in the polymerization mixture. The modified amino acid monomers are hydrophilic compounds which contribute significantly to the swelling of the polymer in water and permit higher oxygen diffusion.

The alpha,beta-unsaturated carbonyl modifier for the modified amino acids of this invention are acrylic acid, crotonic acid, methacrylic acid, maleic acid, fumaric acid, itaconic acid and their functional derivatives, i.e., acid chlorides, anhydrides, amides and esters. The more preferred are methacrylic, acid, acrylic acid and the acid chlorides thereof.

An amino acid is an organic acid whose molecule contains both a carboxyl group (COOH) and an amino group ($NH_2$) coupled with an alkyl, cycloalkyl, aryl or hetrocyclic structure, the alkyl, cycloalkyl or hetrocyclic structure being free of olefinic unsaturation. The alpha,beta-carbonyl substituent can be attached to either the amino group or the hydroxy group of the amino acid, depending on the structure of the amino acid. Additionally, the carbonyl substituent can attach to other reactive groups, if present, in the amino acid, e.g., thiol (SH) or phenolic hydroxyl.

Amino acids useful in the preparation of the modified acids of this invention include beta-alanine, gamma-aminobutyric acid, omega-aminocaproic acid, omega-aminododecanoic acid, beta-cyanoalanine, epsilon-methylhistidine, canavanine, djenkoic acid, 1-azaserine, gamma-methylene glutamic acid, N-methyltyrosine, glycine, alanine, serine, cystine, cysteine, lanthionine, phenylalanine, tyrosine, diiodotyrosine, tryptophan, histidine, aminobutyric acid, methionine, valine, norvaline, leucine, isoleucine, norleucine, arginine, ornithine-,lysine, aspartic acid, glutamic acid, threonine, hydroxyglutamic acid, proline, hydroxyproline, asparagine, glutamine, desmosine, isodesmosine and 5-hydroxy lysine.

It should be understood that other, though perhaps less common, amino acids occuring in nature or prepared synthetically, including those shown in the examples which follow, are within the scope of this invention. Reactive sites on the amino acids can be partially blocked by saturated nonpolymerizable substitutents provided that one reactive site is substituted by the alpha,beta-carbonyl substitutent.

The polymers of th,is invention are cross-linked by all types of cross-linking compounds used in the prior art, see for instance U.S. Pat. No. 3,822,089 granted July 2, 1974 to O. Wichterle, U.S. Pat. No. 4,152,508 granted May 1, 1979 to E. J. Ellis et al or U.S. Pat. No. 4,440,919 granted Apr. 3, 1984 to R. C. Chromecek et al. The cross-linking agent is preferably employed in an amount from 0.1 to 2.0 weight percent of the total monomers present. Examples of cross-linking agents include polyfunctional derivatives of the previously enumerated alpha,beta-unsaturated acids, e.g., acrylic acid, methacrylic acid, crotonic acid, itaconic acid, maleic acid and fumaric acid, acrylamide, methacrylamide and multi-vinyl substituted benzenes. More particularly these cross-linking agents include but are not limited to the following: ethylene glycol diacrylate or dimethacrylate, diethylene glycol diacrylate or dimethylacrylate, tetraethylene glycol diacrylate or dimethacrylate, polyethylene glycol diacrylate or dimethacrylate, trimethylolpropane triacrylate or trimethacrylate, Bisphenol A diacrylate or dimethacrylate, ethoxylated Bisphenol A diacrylate or dimethacrylate, pentaerythritol tri- and tetra- acrylate or methacrylate, tetramethylene diacrylate or dimethacrylate, methylene bis- acrylamide or methacrylamide, dimethylene bis-acrylamide or methacrylamide, N,N'-dihydroxyethylene bis-acrylamide or methacrylamide, hexamethylene bis-acrylamide or methacrylamide, decamethylene bis-acrylamide or methacrylamide, divinyl benzene, vinyl methacrylate and allyl methacrylate.

Still other useful cross-linking agents include 1,3-bis (4-methacryloyl oxyalkyl) tetra disiloxane and similar poly(organo-siloxane) monomers set forth in U.S. Pat. No. 4,153,641 granted May 8, 1979 to W. G. Deichert et al. Another group of useful cross-linking agents are the resonance free di(alkylene tertiary amine) cyclic compounds, e.g., N,N'-divinyl ethylene urea, as disclosed in U.S. Pat. No. 4,436,887 granted Mar. 13, 1984 to R. C. Chromecek et al. Yet another group are di- or polyvinyl ethers of di- or polyvalent alcohols such as ethylene glycol divinyl ether.

For some applications the polymerizates formed from the above hydrophilic monomer(s), modified amino acid monomer(s) and cross-linking agent(s) may lack the desired physical handling properties. It is another aspect of this invention in such circumstances to incorporate in the above polymers from 1 to 15 weight percent of the total monomers present one or more hydrophobic monomers. More preferably the hydrophobic monomer would be present in an amount from 4 to 15 weight percent of the total monomers present. Among other things, the hydrophobic monomers are useful as modulus modifiers.

The modulus modifier is selected from the group consisting of cycloalkyl ester, tertiary-butyl styrene, polycyclic acrylate or methacrylate, and mixtures thereof. More particularly the polycyclic modifiers are selected from the group consisting of isobornyl acrylate, isobornyl methacrylate, dicyclopentanedienyl acrylate, dicyclopentanedienyl methacrylate, adamantyl acrylate, adamantyl methacrylate, isopinocamphyl acrylate isopinocamphyl methcrylate and mixtures thereof. The cycloalkyl ester modifier is of formula I below. Illustrative of these cycloalkyl modifiers are menthyl methacrylate, menthyl acrylate, tertiary-butyl cyclohexyl methacrylate, isohexyl cyclopentyl acrylate and methylisopentyl cyclooctyl acrylate.

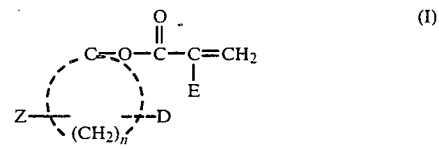

wherein:
D is branched or normal alkyl of 3 to 6 carbon atoms
E is H or $CH_3$
Z is H or $CH_3$
n is an integer from 3 to 8.

In addition to the modulus modifiers, other well known hydrophobic monomers may be used in the formulation of the polymers of this invention to further tailor the properties to the particular application. The hydrophobic monomers of this invention include monomers which contain at least one silicon or fluorine atom as a part of its composition. Hydrophobic monomers include alkyl, cyclo-alkyl and aryl acrylates and methacrylates as well as mono or disubstituted itaconates, styrene and its derivatives, acrylonitrile, vinyl esters such as vinyl acetate or vinyl pentacetyl gluconate, vinyl ethers such as vinyl butyl ether, allyl esters such as allyl acetate, propionate or butyrate, fluorine containing monomers such as octafluoropentyl methacrylate and silicon containing monomer., e.g., 1,1,1-tris(trimethoxysiloxy)-3-methacryloxypropylsilane or heptamethyltrisiloxanyl ethyl acrylate.

The hydrophilic monomer(s) when mixed with the modified amino acid monomer(s), optional hydrophobic and cross-linking agent monomers are generally clear, colorless liquids of varying viscosity. These monomer mixtures can be readily cured to cast shapes by conventional methods such as free radical initiation.

The free radical type initiators suitable for this invention include peroxides, azo compounds, UV initiation, oxidation-reduction systems and similar initiators described in the literature. Illustrative of free radical initiators which can be employed are bis(isopropyl) peroxy dicarbonate, 2,2'-azobis[isobutyronitrile], acetyl peroxide, benzoin methyl ether, lauroyl peroxide, decanoyl peroxide, benzoyl peroxide, 2,2'-azobis[2,4-dimethylvaleronitrile], tertiary-butyl peroctoate, phthalic peroxide, cumene hydroperoxide, diethoxyacetophenone, tertiary-butyl peroxypivalate and the like.

As is well known in the contact lens art, water soluble diluents may be used with the foregoing polymers to modify the physical properties of these polymers. More particularly, the diluents may be advantageous in improving machinability and swell characteristics of the polymer. Typically, the amount of diluent will be less than 50 weight percent of the total monomers employed and preferably not more than 30 weight percent. In a particular polymer system, the limiting amount of diluent is the solubility of the diluent in the monomer system. Thus, there should be no phase separation between diluent and starting monomer mixture. Additionally, excessive amounts of diluent will result in collapse of the cell structure of the finished biomedical devices when the device is hydrated, i.e., replacement of diluent by water. The maximum amount of diluent is readily ascertained by swelling the diluent-free polymer in the proposed diluent and measuring the degree of swell. Comparable results are obtained when using solvent soluble diluents wherein the solvent does not affect the lens polymer. These solvents include ketones, e.g., methyl ethyl ketone and isopropyl alcohol. Suitable diluents include ethylene glycol, glycerine, liquid polyethylene glycols, butanol, butanol/water mixtures, ethylene oxide/propylene oxide block copolymers having a molecular weight from 1,000 to 5,000, linear poly(vinyl pyrrolidinone) having a molecular weight from 500 to 10,000, low molecular weight linear poly(hydroxyethyl methacrylate), glycol esters of lactic acid, formamide, dimethyl formamide, methyl ethyl ketone, dimethyl sulfoxide and the like. In the finished biomedical device, it will be necessary to replace any diluent with an aqueous solution. The contact lens should, of course, contain a physiological saline solution as the aqueous medium.

The polymers of this invention can be formed into biomedical devices and contact lenses by methods well known in the prior art. By way of example, the mixture of hydrophilic monomer(s), modified amino acid monomer(s) cross-linking agent, free radical initiator and optional hydrophobic monomer described above is purged with an inert gas such as nitrogen or carbon dioxide and placed into polypropylene tubes having dimensions of 18 mm $\times$ 300 mm. The polymerization is then carried out by gradually heating from 30° C. to 110° C. in a step fashion over a span of several days. In a typical schedule the tubes are placed in a water bath from 30° C. to 50° C. for two to three days followed by two days at 60° C. The rod is then removed from the mold and post-cured at 110° C. for a period of about four hours. The fully cured rods are then cut into cylinders, optionally then annealed at temperature up to 150° C. and machined to form contact lenses as desired. Other conventional methods such as compression molding as disclosed in U.S. Pat. Nos. 4,084,459 and 4,197,266 or spincasting process as described in U.S. Pat. Nos. 3,408,429 and 3,496,254 can be employed to prepare useful objects of this invention.

The contact lenses made from the polymer of the instant invention are oxygen permeable. A critical oxygen tension and flux under a lens should be about 10 mmHg and 2 ml/(cm$^2$hr.) respectively below which corneal swelling occurs, see Polse and Decker, *Investigative Ophthalmology and Visual Science,* vol.18, p 188, 1979. In order to meet these requirements, the lens material must have adequate oxygen permeability. These more preferred contact lenses have an oxygen permeability of at least about $24 \times 10^{-11}$ cm$^3$cm/sec·cm$^2$ mmHg), are hydrolytically stable, biologically inert and transparent. In comparison, the well-known contact lens polymer polyhydroxyethyl methacrylate) has an oxygen permeability value of about one-third of the polymers of this invention.

Additionally, these lenses are hydrolytically stable, meaning that when the contact lenses are placed into an aqueous solution, e.g., on the eye, or during the disinfecting step, i.e., water plus heat, the lenses will not change in chemical composition, i.e., hydrolyze. On heating in boiling water for 120 hours, the typical polymer of this invention experiences a water content loss of three percent or less. The most preferred lenses/polymers of this invention have a stable, i.e., less than one percent change, water content. Thus, the polymers and copolymers disclosed herein can be boiled and/or autoclaved in water without being damaged whereby sterilization may be achieved.

The polymers and copolymers of this invention being soft yet resilient and hard to tear are well suited for use in biomedical devices, including contact lenses. It is well known that the wearer of soft contact lenses will have an unavoidable amount of handling of the lenses. Part of the cleaning and rinsing procedure is to rub each lens and tearing has been a concern in prior art lenses. The polymers and copolymers of the present invention have a tear initiation strength (ASTM D-1938) of up to 5 g/mm of thickness.

An article formed from the disclosed polymers and copolymers may be used in surgery where an article compatible with living tissue or with the mucous membranes is desired. These polymers can also be used in preparing medical surgical devices, e.g., heart valves, vessel substitutes, intrauterine devices, membranes and other films, dialyzer diaphragms, catheters, mouth guards, denture liners and other such devices as disclosed in Shephard U.S. Pat. Nos. 3,618,231 and 3,520,949. The instant polymers can be used to modify collagen to make blood vessels, urinary bladders and other such devices as disclosed in Kliment, U.S. Pat. No. 3,563,925. Also, these polymers can be used to make catheters as disclosed in Shephard U.S. Pat. No. 3,566,874. These polymers can be used as semipermeable sheets for dialysis, artificial dentures and all of such disclosures as set forth in Stoy, U.S. Pat. No. 3,607,848. The instant polymers can be used in making breathable leather and other materials as disclosed in Shephard, U.S. Pat. No. 3,660,218.

The terms "shaped article for use in biomedical applicataions" or "biomedical devices" mean the materials disclosed herein have physiochemical properties rendering them suitable for prolonged contact with living tissue, blood and the mucous membranes. These properties are required for biomedical shaped articles such as surgical implants, blood dialysis devices, blood vessels, artificial ureters, artificial breast tissue and membranes intended to come in contact with body fluid outside of the body, e.g., membranes for kidney dialysis and heart-/lung machines and the like. It is known that blood, for example, is rapidly damaged in contact with artificial surfaces. The design of a synthetic surface which is antithrombogenic and nonhemolytic to blood is necessary for prostheses and devices used with blood. The polymers and copolymers are compatible with living tissue.

The following examples are illustrative only and should not be construed as limiting the invention. All parts and percents referred to herein are on a weight basis and all temperatures are expressed in degrees Celsius unless otherwise specified.

PREPARATION OF MODIFIED AMINO ACID MONOMERS

EXAMPLE A

N-Methacryloyl-1-amino-1-cyclohexane carboxylic Acid 1-amino-1-cyclohexane carboxylic acid (48 g, 0.3 mol) is suspended in 250 ml of ice cold water and treated with 13.2 g (0.33 mol) sodium hydroxide to dissolve in it water. The above cold solution is reacted with 35 g (0.38 mol) of methacryloyl chloride and 13.2 g (0.3 mol) of sodium hydroxide in 20 ml of water simultaneously for a period of one hour at the ice-bath temperature. The reaction mixture is allowed to reach room temperature and is stirred at that temperature for another four hours. p-Methoxyphenol is used as an inhibitor.

The brown colored reaction mixture is acidified with 2N HCl to pH 3.0 and extracted with ethylacetate 3 times. The combined ethylacetate layer is washed with sodium chloride saturated water, dried over magnesium sulfate and evaporated to dryness to leave a crystalline material which is recrystallized from ethyl acetate to yield 47.6 g (71%) of the product. Found: melting point 176°–178° C. NMR (DMSO-$d_6$), 12 gamma (s, 1H, COOH), 5.7 gamma (s, 1H, =$CH_2$), 5.3 gamma (m, 1H, =$CH_2$), 0.8–2.2 gamma (br m, 13H).

EXAMPLE B

N-Methacryloylisonipecotic Acid

The procedure of Example A is used in this example. Isonipecotic acid 43 g, (0.33 mol), 39 g (0.39 mol) of methacryloyl chloride, 29.6 g (0.79 mol) of sodium hydroxide and a trace amount of p-methoxyphenol are charged to the reaction vessel. The reaction mixture is run at 0°–5° C. for a period of three hours and acidified with 2N HCl to pH 3.5. White precipitate is formed and extracted with ethyl acetate. The combined organic layer is washed with saturated sodium chloride solution, dried over magnesium sulfate, and evaporated to yield crystalline material which is recrystallized from ethyl acetate, to produce 52.9 g (81%) of the product. Found: melting point 90°–93° C. NMR (CDCl$_3$), 4.9 gamma (s, 1H, =$CH_2$), 4.7 gamma (s, 1H, =$CH_2$), 3.8 gamma (br s, 2H, NCH$_2$), 1.7.

EXAMPLE C

N-Acryloylisonipecotic Acid

The procedure of Example A is used with 43 g (0.3 mol) of isonipecotic acid, 31 g (0.3 mol) of acryloyl chloride, 26.6 g (0.66 mol) of sodium hydroxide at 0° C. (ice-salt bath). The reaction mixture is acidified with 2N HCl to pH 3.0 and extracted with ethyl acetate. The organic layer is washed with a sodium chloride solution, dried over magnesium sulfate to dryness to leave a crystalline material which is crystallized from ethyl acetate n-hexane to yield 33.8 g (60%) product. Melting point 109°–110° C. NMR (CDCl$_3$), 5.4–6.9 gamma (br m, 3H, $CH_2$=CH), 4.0 gamma (br, 2H), 2.1–3.4 gamma (br m, 3H), 1.2–2.1 gamma m, 4H).

EXAMPLE D

N-Methacryloyl-12-aminododecanoic Acid

The same procedure as described above is utilized with 5.4 g (0.052 mol) of methacryloyl chloride, 10 g (0.047 mol) of 12-aminododecanoic acid, 4.4 g (0.01 mol) of sodium hydroxide, and p-methoxyphenol in a mixed solvent (H$_2$O:Dioxane=50:50) at 0°–5° C. Yield after recrystallized from ethyl acetate is 10 g (75%). Melting point 70.8°–72.4° C. NMR (DMSO-$d_6$), 7.8 gamma (br s, 1H, NH), 5.5 gamma (br s, 1H, =$CH_2$), 5.2 gamma (br s, 1H, =$CH_2$), 3.0 gamma (t, 2H, NCH$_2$), 2.1 gamma (t, 2H, CH$_2$COOH), 1.7 gamma (s, 3H, CH$_3$), 1.2 gamma (br s, 18H, (CH$_2$)$_9$).

EXAMPLE E

N-Methacryloyl-6-aminocaproic Acid

The general procedure described before is utilized with 6-aminocaproic acid (66 g, 0.5 mol), 53 g (0.5 mol) of methacryloyl chloride, 40 g, (1 mol) of sodium hydroxide and 30 mg of p-methoxyphenol in ice cold water. Crystallization from ethyl acetate n-hexane afforded 65 g (65%) of the product. Purity determined by bromination 99.8%. NMR (CDCl$_3$), 9.7 gamma (s, 1H, COOH), 6.0 gamma (br s, 1H, NH), 5.7 gamma (br s, 1H, =$CH_2$), 5.3 gamma (br s, 1H, =$CH_2$), 3.3 gamma (q, 2H, NCH$_2$), 2.3 gamma (t, 2H, CH$_2$O), 1.9 gamma (s, 3H, CH$_3$), 1.6 gamma (br s, 8H, (CH$_2$)$_4$).

EXAMPLE F

N-Methacryloyl-4-aminobutanoic Acid

The general procedure above is utilized with 51.5 g (0.5 mol) of 4-aminobutyric acid, 52.39 (0.5 mol) of methacryloyl chloride, 40 g (1 mol) of sodium hydroxide. p-methoxyphenol is used as an inihibitor. Crystallization from ethyl acetate yielded very low melting crystalline material, melting point (30°–35° C.). Purity by bromination 100.14%. NMR (CDCl$_3$), 10.85 gamma (br s, 1H, COOH), 7.1 gamma (br s, 1H, NH), 6.0 gamma (br s, 1H, =$CH_2$), 5.65 gamma (br s, 1H, =$CH_2$), 3.6 gamma (q, 2H, NCH$_2$), 2.6 gamma (t, 2H, CH$_2$CO), 2.2 gamma (br s, 5H, CH$_3$ and CH$_2$CH$_2$CH$_2$).

EXAMPLE G

N-Methacryloylglycine

Glycine (75 g, 1 mol) is dissolved in 500 ml of 40 g (1 mol) of sodium hydroxide in the ice bath and the clear solution is reacted with 105 g (1 mol) of methacryloyl chloride and 40 g (1 mol) of sodium hydroxide in 150 ml of water simultaneously. The reaction temperature is kept below 5° C. throughout the addition. The reaction mixture is allowed to rise to room temperature and stirred at that temperature for three hours. The clear solution was titrated with 1N HCl to pH 3.0 and extracted with ethylacetate. The combined organic layer is dried over anhydrous magnesium sulfate and evaporated to leave 70 g (46%) of a crystalline material. Melting point 104° C. (literature 104°–105.5° C.). NMR ($D_2O$), 5.7 gamma (s, 1H, =$CH_2$), 5.4 gamma (s, 1H, =$CH_2$), 4.0 gamma (s, 2H, $CH_2$), 1.9 gamma (s, 3H, $CH_3$). Purity by neutralization, 100.1%; purity by bromination, 100.8%.

EXAMPLE H

N-Methacryloyl-L-aspartic Acid

L-Aspartic acid (67 g, 0.5 mol) is dissolved in 48 g (1 mol) of sodium hydroxide in 300 ml of water and the solution is cooled down in an ice-bath. p-Methoxyphenol (50 mg) is used as an inhibitor. To the above reaction mixture, is added 58 g (0.5 mol) of methacryloyl chloride (freshly distilled) and 20 g (0.5 mol) of sodium hydroxide in 80 ml of water simultaneously at a rate to keep the reaction temperature below 5° C. The reaction is allowed to reach room temperature and stirred for another three hours. The reaction mixture is acidified to pH 3.0 with 3N HCl and extracted with ethyl acetate. The combined organic layer is washed with saturated sodium chloride solution and dried over magnesium sulfate. The dried organic layer is evaporated to dryness and crystallized from ethylacetate to yield 60 g (56%) of product. Melting point (93°–96° C.). NMR ($D_2O$), 5.6 gamma (d, 1H, =$CH_2$), 5.4 gamma (d, 1H, =$CH_2$), 2.9 gamma (d, 2H, $CH_2$), 1.8 gamma (s, 3H, $CH_3$).

EXAMPLE I

N-Methacryloyl-L-glutamic Acid

The same procedure as described in Example A is utilized with 100 g (0.6 mol) of L-glutamic acid monosodium salt, 50 g (0.125 mol) of sodium hydroxide, and 63 g of methacryloyl chloride to yield 62 g (48.7%) of a crystalline material, melting point 128°–130° C. NMR ($D_2O$), 5.7 gamma (s, 1H, =$CH_2$), 5.4 gamma (s, 1H, =$CH_2$), 4.4 gamma (2 d, 1H, CH), 2.0–2.7 gamma (m, 4H, $CH_2CH_2$), and 1.9 gamma (s, 3H, $CH_3$).

EXAMPLE J

N-Methacryloylaminodiacetic acid

The general procedure of Example A is utilized with 50 g (0.37 mol) of aminodiacetic acid, 38.5 g (0.37 mol) of methacryloyl chloride, 59.2 g (1.48 mol) of sodium hydroxide and p-methoxyphenol. After acidifying and saturating with sodium chloride, acetonitrile is used to extract. The organic layer is washed with saturated sodium chloride, dried over magnesium sulfate and evaporated to dryness in vacuo to leave a crystalline material 35 g (41%), melting point (108°–110° C.). NMR (DMSO-$d_6$), 5.6 gamma (br s, 1H, 4.9 gamma (br s, 1H, =$CH_2$), 4.1 gamma (s, 2H, $CH_2$), 3.9 gamma (s, 2H, $CH_2$), 1.7 gamma (s, 3H, $CH_3$).

EXAMPLE K

N-Methacryloylglycylglycine

The procedure described above is utilized with 132 g (0.1 mol) of glycylglycine, 105 g of methacryloyl chloride, 80 g of sodium hydroxide and 500 mg of p-methoxyphenol at 0°–5° C. White precipitate is formed from the reaction mixture. The precipitate crystallized from water had a melting point of (192°–196° C.). Yield of product was 150 g (70.8%). NMR (DMSO-$d_6$), 11 gamma (s, 1H, COOH), 7.9 gamma (s, 2H, NH), 5.5 gamma (s, 1H, =$CH_2C$), 5.2 gamma (s, 1H, =$CH_2$), 3.5 gamma (d, 4H, $CH_2$), 2.6 gamma (s, 3H, $CH_3$).

THE POLYMERS OF THIS INVENTION

EXAMPLE 1

N-Methacryloylglycine (hereafter referred to as MG) prepared in Example G, 4 g, is dissolved in 95.4 g of 2-hydroxyethyl methacrylate (hereafter referred to as HEMA) and 0.6 g of ethyleneglycol dimethacrylate (hereafter referred to as EGDMA). Then benzoin methyl ether (hereafter referred to as BME), 0.17 g, is added and the clear solution of monomers is polymerized by ultraviolet light between two glass plates. The clear homogeneous membrane is swollen in a phosphate buffered saline solution pH 7.3 (disodium phosphate 0.14%, monosodium phosphate 0.045%, sodium chloride 0.78%). The polymer contained 61.5% water, its oxygen permeability is 2.6 times better than corresponding poly (HEMA) membrane of the same thickness.

To avoid differences in the interpretation of the oxygen permeability determination, poly(HEMA) hydrogel (hereafter referred to as PHEMA) is used as a control. The oxygen permeability is expressed as a ratio of the permeability of the copolymer/permeability of PHEMA. A typical oxygen permeability value for PHEMA hydrogel is $8.0 \times 10^{-11}$ $cm^3cm/(sec \cdot cm^2$ mmHg) or $8.08 \times 10^{-6}$ $cm^3$(STP)cm/sec·$cm^2$ Newtons/$cm^2$. The oxygen permeability measurements are made using a flat polarographic sensor. The method used is basically that described by Refojo, M., Holly, F. and Leong, F. L., Contact and Intraocular Lens Medical Journal, Vol. 3, Issue 4, p. 27, (1977). The determinations are carried out on samples having a thickness of about 0.3 mm. The values are corrected for sample thickness.

EXAMPLE 2

Following the procedure of Example 1, MG, 6 g, is copolymerized with 93.7 g of HEMA and 0.3 g of EGDMA. The resulting polymer has a water content of 64.6% and oxygen permeability of 3.2 times PHEMA.

Additional polymers with different cross-linking agents are prepared. The total amount of MG, HEMA and cross-linker in each case is 100g. The formulation changes and test results are contained in TABLE I below. In every instance high water content polymers having substantially higher oxygen permeability than PHEMA are obtained.

TABLE I

| | Effect of the cross-linkers | | |
|---|---|---|---|
| Composition | Cross-linker[1] | Amount (g) | Water Content (%) | Oxygen Permeability x PHEMA |
| 1 | EGDMA | 0.3 | 64.6 | 3.2 |
| 2 | EGDMA | 0.6 | 62.8 | 3.1 |
| 3 | EGDMA | 1.0 | 64.4 | 2.7 |
| 4 | EGDMA | 2.0 | 55.7 | 2.5 |
| 5 | DAG | 0.3 | 67.6 | 4.0 |
| 6 | DAG | 0.6 | 66.5 | 3.7 |
| 7 | DAG | 1.0 | 64.2 | 3.4 |
| 8 | DAG | 2.0 | 64.7 | 3.2 |
| 9 | DMP | 0.3 | 66.3 | 3.2 |
| 10 | DMP | 0.6 | 63.6 | 3.0 |

TABLE I-continued

Effect of the cross-linkers

| Composition | Cross-linker[1] | Amount (g) | Water Content (%) | Oxygen Permeability x PHEMA |
|---|---|---|---|---|
| 11 | DMP | 1.0 | 65.2 | 3.0 |
| 12 | DMP | 2.0 | 59.6 | 2.6 |
| 13 | MBAA | 0.3 | 67.0 | 3.1 |
| 14 | MBAA | 0.6 | 65.9 | 3.1 |
| 15 | MBAA | 1.0 | 64.1 | 2.8 |
| 16 | MBAA | 2.0 | 61.5 | 2.7 |
| 17 | M2 | 0.3 | 73.1 | 3.5 |
| 18 | M2 | 0.6 | 73.7 | 3.2 |
| 19 | M2 | 1.0 | 71.7 | 3.1 |
| 20 | M2 | 2.0 | 61.8 | 3.0 |
| 21 | PEGDA | 0.3 | 68.9 | 3.2 |
| 22 | PEGDA | 0.6 | 64.7 | 2.9 |
| 23 | PEGDA | 1.0 | 63.7 | 2.7 |
| 24 | PEGDA | 2.0 | 58.0 | 2.6 |
| 25 | 1,3 BUGDA | 0.3 | 66.7 | 2.1 |
| 26 | 1,3 BUGDA | 0.6 | 64.8 | 2.1 |
| 27 | 1,3 BUGDA | 1.0 | 63.0 | 1.8 |
| 28 | 1,3 BUGDA | 2.0 | 57.2 | 1.8 |
| 29 | 1,4 BUGDA | 0.3 | 68.4 | 4.1 |
| 30 | 1,4 BUGDA | 0.6 | 65.8 | — |
| 31 | 1,4 BUGDA | 1.0 | 63.4 | 2.3 |
| 32 | 1,4 BUGDA | 2.0 | 58.7 | 2.0 |
| 33 | HEXDDA | 0.3 | 64.6 | 2.6 |
| 34 | HEXDDA | 0.6 | 63.4 | 2.5 |
| 35 | HEXDDA | 1.0 | 59.5 | 1.9 |
| 36 | HEXDDA | 2.0 | 55.0 | 1.6 |

NOTE:
DAG - 1,2-Dimethacrylamidoethylene glycol
DMP - 1,3-Dimethacrylamido-2-hydroxypropane
MBAA - Methylene bis-acrylamide
M2 - 1,3-Bis-(4-methacryloyl oxybutyl) tetramethyl disiloxane
PEGDA - Polyethylene glycol 400 diacrylate
1,3 BUGDA - 1,3-Butylene glycol diacrylate
1,4 BUGDA - 1,4-Butylene glycol diacrylate
HEXDDA - 1,6-Hexane dioldiacrylate

EXAMPLE 3

The procedure of Example 1 is repeated using a constant amount of MG but different and varying amounts of cross-linking monomer and hydrophobic comonomers. The balance of each composition is HEMA. The formulation of each composition is stated in TABLE II below while the test results are stated in TABLE II-A below. Introduction of monomers with bulky, cyclic side chains improves the mechanical properties, particularly tensile strength and tear while conserving the improved oxygen permeability of the copolymer.

TABLE II

| | Comonomers MONOMER | | | | | | |
|---|---|---|---|---|---|---|---|
| Composition | EGDMA | HEMA | IBOA[1] | IBOMA[2] | MG | TBCM[3] | OFP[4] |
| INVENTION | | | | | | | |
| 1 | 0.3 | 88.7 | 5 | — | 6 | — | — |
| 2 | 0.6 | 83.4 | 10 | — | 6 | — | — |
| 3 | 0.3 | 88.7 | — | 5 | 6 | — | — |
| 4 | 0.3 | 83.7 | — | 10 | 6 | — | — |
| 5 | 0.8 | 88.2 | — | 5 | 6 | — | — |
| 6 | 0.6 | 85.9 | — | 7.5 | 6 | — | — |
| 7 | 0.6 | 83.4 | — | 10.0 | 6 | — | — |
| 8 | 0.3 | 88.7 | — | — | 6 | 5 | — |
| 9 | 0.3 | 86.2 | — | — | 6 | 7.5 | — |
| 10 | 0.3 | 83.7 | — | — | 6 | 10 | — |
| 11 | 0.6 | 88.4 | — | — | 6 | 5 | — |
| 12 | 0.6 | 85.4 | — | — | 6 | 7.5 | — |
| 13 | 0.6 | 83.7 | — | — | 6 | 10 | — |
| 14 | 0.5 | 83.5 | — | — | 6 | — | 10 |
| 15 | 0.5 | 83.5 | — | 5 | 6 | — | 5 |
| COMPARATIVE | | | | | | | |
| 16 | Commercial contact lens[5] | | | | | | |

NOTES:
[1]IBOA — isobornyl acrylate
[2]IBOMA — isobornyl methacrylate
[3]TBCM — tertiary-butyl cyclohexyl methacrylate
[4]OFP — octafluoropentyl methacrylate
[5]this lens is available under the trademark Hydrocurve II from Barnes-Hind, contains HEMA, diacetone acrylamide and 2-ethyl(2-hydroxymethyl)-1,3-propanediol trimethacrylate

TABLE II-A

| | Comonomers | | | | | | |
|---|---|---|---|---|---|---|---|
| Property Composition | TS | MOD | EL | Tear IN | Tear PROP | Water Content (%) | Oxygen Permeability (xPHEMA) |
| 1 | 30 | 46 | 99 | 1.31 | 1.07 | 64.1 | 2.8 |
| 2 | 42 | 60 | 96 | 2.33 | 1.75 | 61.8 | 2.4 |
| 3 | 41 | 76 | 79 | 2.65 | 1.88 | 59.9 | 2.0 |
| 4 | 57 | 87 | 106 | 3.99 | 3.99 | 57.2 | 1.9 |
| 5 | 40 | 72 | 81 | 1.91 | 1.91 | 60.1 | 2.3 |
| 6 | 37 | 79 | 70 | 2.48 | 2.48 | 57.0 | 2.2 |
| 7 | 48 | 88 | 85 | 4.20 | 3.03 | 56.0 | 2.1 |
| 8 | 39 | 78 | 82 | 2.27 | 2.07 | 63.0 | 2.4 |
| 9 | 50 | 69 | 75 | 3.07 | 2.65 | 61.9 | 2.1 |
| 10 | 78 | 131 | 95 | 4.65 | 4.65 | 53.8 | 2.1 |
| 11 | 41 | 73 | 83 | 2.88 | 1.96 | 60.0 | 2.4 |
| 12 | 51 | 94 | 85 | 3.84 | 2.88 | 57.9 | 2.2 |
| 13 | 65 | 142 | 75 | 5.07 | 3.50 | 55.9 | 1.8 |
| 14 | 35 | 47 | 116 | 2.20 | 1.74 | 58.4 | 3.0 |
| 15 | 33 | 48 | 108 | 2.90 | 2.05 | 58.1 | 3.0 |
| 16 | 36 | 38 | 171 | 2.81 | 2.40 | 55.0 | 1.7 |

NOTE:
TS - Tensile strength, g/mm$^2$
MOD - Modulus of elasticity, g/mm$^2$
EL - Elongation at break, %
TEAR - ASTM 1938, g/mm,
IN - Initial
PROP - Propagation

EXAMPLE 4

The procedure of example 1 is repeated using different amounts of MG and the cross-linking monomer. The total amount of MG, HEMA and cross-linking monomer is 100 g. The composition changes and test results are stated in TABLE III below. Increasing amounts of MG increases the water content and oxygen permeability of the polymers.

TABLE III

Effect of the concentration of MG

| Composition | MG, g | Cross-Linker | Amount (g) | Water Content, % | Oxygen Permeability xPHEMA |
|---|---|---|---|---|---|
| 1 | 6 | EGDMA | 0.3 | 64.6 | 3.0 |
| 2 | 9 | EGDMA | 0.3 | 74.5 | 3.9 |
| 3 | 12 | EGDMA | 0.3 | 80.1 | 4.1 |
| 4 | 6 | EGDMA | 0.6 | 62.8 | 3.1 |
| 5 | 9 | EGDMA | 0.6 | 65.4 | 3.2 |
| 6 | 12 | EGDMA | 0.6 | 68.3 | 3.5 |
| 7 | 6 | EGDMA | 1.0 | 60.1 | 2.5 |
| 8 | 9 | EGDMA | 1.0 | 62.3 | 2.7 |
| 9 | 12 | EGDMA | 1.0 | 66.8 | 3.2 |
| 10 | 6 | PEGDA | 0.3 | 68.9 | 3.7 |
| 11 | 9 | PEGDA | 0.3 | 73.5 | 3.5 |
| 12 | 12 | PEGDA | 0.3 | 79.2 | 4.2 |
| 13 | 6 | PEGDA | 0.6 | 65.2 | 3.2 |
| 14 | 9 | PEGDA | 0.6 | 69.6 | 3.6 |
| 15 | 12 | PEGDA | 0.6 | 73.5 | 4.3 |
| 16 | 6 | PEGDA | 1.0 | 70.4 | 2.8 |
| 17 | 9 | PEGDA | 1.0 | 72.2 | 3.0 |
| 18 | 12 | PEGDA | 1.0 | 74.0 | 3.1 |

EXAMPLE 5

Example 3 is repeated with comonomers which contribute to the elasticity of the resulting copolymers. The formulation of each compostion is stated in TABLE IV below while the test results are stated in TABLE IV-A below. The clear copolymers are suitable for use in biomedical applications.

TABLE IV

Plasticizing comonomers

| Composition | MG | HEMA | EDGMA | BUMA[1] | EHMA[2] | HEXYLMA[3] |
|---|---|---|---|---|---|---|
| 1 | 6 | 88.7 | 0.3 | 5 | — | — |
| 2 | 6 | 83.7 | 0.3 | 10 | — | — |
| 3 | 6 | 88.7 | 0.3 | — | 5 | — |
| 4 | 6 | 83.7 | 0.3 | — | 10 | — |
| 5 | 6 | 88.7 | 0.3 | — | — | 5 |
| 6 | 6 | 83.7 | 0.3 | — | — | 10 |

NOTE
[1]BUMA — n-butyl methacrylate
[2]EHMA — 2-ethylhexyl methacrylate
[3]HEXYLMA — n-hexyl methacrylate

TABLE IV-A

Plasticizing comonomers

| Property: Composition | TS | MOD | EL | Tear IN | Tear PROP | Water Content (%) | Oxygen Permeability (xPHEMA) |
|---|---|---|---|---|---|---|---|
| 1 | 28 | 36 | 126 | 1.37 | 1.37 | 66.3 | 2.8 |
| 2 | 27 | 30 | 154 | 1.61 | 1.61 | 64.4 | 2.5 |
| 3 | 38 | 52 | 117 | 2.43 | 1.64 | 57.9 | 2.3 |
| 4 | 43 | 49 | 153 | 3.53 | 2.37 | 52.0 | 2.4 |
| 5 | 34 | 39 | 138 | 1.39 | 1.39 | 66.6 | 2.5 |
| 6 | 24 | 40 | 125 | 2.45 | 1.73 | 61.6 | 2.4 |

EXAMPLE 6

The procedure of Example 1 is repeated in which other modified amino acid monomers are substituted for MG. Additionally in some cases another cross-linking monomer has been substituted for EGDMA. The total amount of modified amino, acid monomer and HEMA in each of the following compositions is 1 mol. The formulation of each composition is stated in TABLE V below and test results are stated in TABLE V-A below.

Results similar to those in TABLE V-A are obtained when the modified amino acid monomer is N-methacryloyl-L-glutamic acid of Example I, or N-methacryloyl-1-amino-1-cyclohexane carboxylic acid of Example A, or N-methacryloyl isonipecotic acid of Example B.

EXAMPLE 7

A casting solution is prepared by mixing together 83.5 g of HEMA, 6 g of MG, 10 g of IBOMA and 0.5 g of EGDMA. To the mixture is added 0.5 g of BME. The mixed, filtered solution is placed in a suitable contact lens spincasting mold. It is spin cast with UV radiation for one half hour to obtained the desired lens. The lens of this invention is optically clear, oxygen permeable and easy to handle.

A second lens is prepared in the same manner but with a well known prior art monomer mixture. The mixture is 99.4 g of HEMA, 0.4 g of EGDMA and 0.2 g BME.

Both lenses are released from the mold, extracted and equilibrated in a phosphate buffered saline solution as described in Example 1.

TABLE V

Modified amino acids

| COMPOSITION | MASP[1] (mol) | DIAC[2] (mol) | DOD[3] (mol) | MGG[4] (mol) | HEMA (mol) | PEGDA wt % | EGDMA wt % |
|---|---|---|---|---|---|---|---|
| 1 | 0.10 | — | — | — | 0.90 | 1.0 | — |
| 2 | — | 0.10 | — | — | 0.90 | — | 0.30 |
| 3 | — | — | 0.10 | — | 0.90 | — | 0.30 |
| 4 | — | — | — | 0.02 | 0.98 | — | 0.30 |
| 5 | — | — | — | 0.30 | 0.97 | — | 0.30 |

TABLE V-continued

| | Modified amino acids | | | | | | |
|---|---|---|---|---|---|---|---|
| | MONOMER: | | | | | | |
| COMPOSITION | MASP[1] (mol) | DIAC[2] (mol) | DOD[3] (mol) | MGG[4] (mol) | HEMA (mol) | PEGDA wt % | EGDMA wt % |
| 6 | — | — | — | 0.05 | 0.95 | — | 0.30 |

NOTE:
[1]MASP-N—methacryloyl-L-aspartic acid (Example H)
[2]DIAC-N—methacryloyl aminodiacetic acid (Example J)
[3]DOD-N—methacryloyl-12-aminododecanoic acid (Example D)
[4]MGG-N—methacryloylglycyglycine (Example K)

TABLE V-A

| PROPERTY: | Modified amino acids | |
|---|---|---|
| Composition | WATER CONTENT, % | OXYGEN PERMEABILITY x PHEMA) |
| 1 | 85.1 | 3.8 |
| 2 | 60.0 | 1.8 |
| 3 | 63.5 | 1.8 |
| 4 | 45.2 | 1.3 |
| 5 | 53.0 | 1.9 |
| 6 | 61.0 | 2.6 |

The oxygen permeability and water content properties of each lens are determined. The prior art lens has a water content of 38.6% and an oxygen permeability of 1×PHEMA. The lens of this invention has a water content of 60% and an oxygen permeability of 2.7×PHEMA.

Other differences in these polymers include handling characteristics of the lenses when having a center thickness of 0.07 mm. The prior art lens has a tendency to sag, fold and stick together in handling, whereas the lens of this invention holds its shape and does not fold or stick. This difference is believed to be due to the higher modulus of elasticity of the polymer of this invention.

EXAMPLE 8

A mixture containing 74.5 g of HEMA, 4 g of N-methacrylol-12-aminododecanoic acid of Example D, 15 g of N-vinyl pyrrolidinone, 6 g of t-butyl cyclohexyl methacrylate, 0.3 g of EGDMA and 0.2 g of 2,2'-azobis-(isobutylnitrile) polymerization initiator is mixed together. The solution is purged with nitrogen for 10 minutes and then poured into a polyethylene tube having a diameter of 18 mm and a length of 300 mm. The tube is closed and immersed in a constant temperature bath and heated to 30° to 35° C. for 72 hours, then the temperature is raised to and maintained at 42° to 47° C. for 48 hours and then a final heating temperature period of 60° C. for one hour. The resulting rod is removed from the tube and post-cured for two hours at 110° C. Cylinders are cut from the rod. From the cylinders, lenses or flat disks are machined.

EXAMPLE 9

A mixture of 89.5 g of HEMA, 4 g of N-methacrylol-4-aminobutanoic acid of Example F, 6 g of 1,1,1-tris(-trimethylsiloxy)-3-methacryloxypropylsilane and 0.5 g of EGDMA is prepared. To the clear mixture is added 0.5 g of BME. The solution is placed between glass plates, polymerized and then swelled as in Example 1. The resulting film is optically clear, oxygen permeable and having satisfactory handling characteristics for a contact lens.

The foregoing examples and methods have been described in the foregoing specification for the purpose of illustration and not limitation. Many other modifications and ramifications will naturally suggest themselves to those skilled in the art based on this disclosure. These are intended to be within the scope of this invention.

The embodiments of the invention in which an exclusive property or privilege is claimed are defined as follows:

1. A shaped article for biomedical applications made from a polymer formed by polymerizing together a mixture comprising:
   (1) a major amount of one or more hydrophilic monomers having an olefinic bond,
   (2) an alpha, beta-unsaturated carbonyl modified amino acid monomer in an amount of 1 to 15 weight percent, and
   (3) a cross-linking agent in an amount of at least 0.1 weight percent.

2. The article of claim 1 wherein the alpha,beta-unsaturated carbonyl modifier of the amino acid is selected from the group consisting of acrylic acid, crotonic acid, methacrylic acid, maleic acid, fumaric acid, itaconic acid, 2-acrylamido-2-methylpropane sulfonic acid and the acid chloride, anhydride, amide and ester of said acids.

3. The article of claim 2 wherein the carbonyl modifier is selected from the group consisting of methacrylic acid, acrylic acid, methacryloyl chloride and acryloyl chloride.

4. The article of claim 3 wherein the carbonyl modified amino acid monomer is present in an amount of 3 to 12 weight percent of the total monomers present.

5. The article of claim 4 wherein said mixture includes a hydrophobic monomer in an amount of 1 to 15 weight percent of the total monomers present.

6. The article of claim 5 wherein the hydrophobic monomer contains at least one silicon or fluorine atom.

7. The article of claim 5 wherein the hydrophobic monomer is present in an amount of 4 to 15 weight percent of the total monomers present.

8. The article of claim 4 wherein the cross-linking agent present in an amount of 0.1 to 2.0 weight percent of the total monomers present.

9. The article of claim 8 wherein the hydrophilic monomer is a hydroxyalkyl ester of an alpha, beta-unsaturated carboxylic acid.

10. The article of claim 8 wherein there are two hydrophilic monomers.

11. The article of claim 9 wherein said article is a contact lens.

* * * * *